United States Patent Office 3,623,165
Patented Nov. 30, 1971

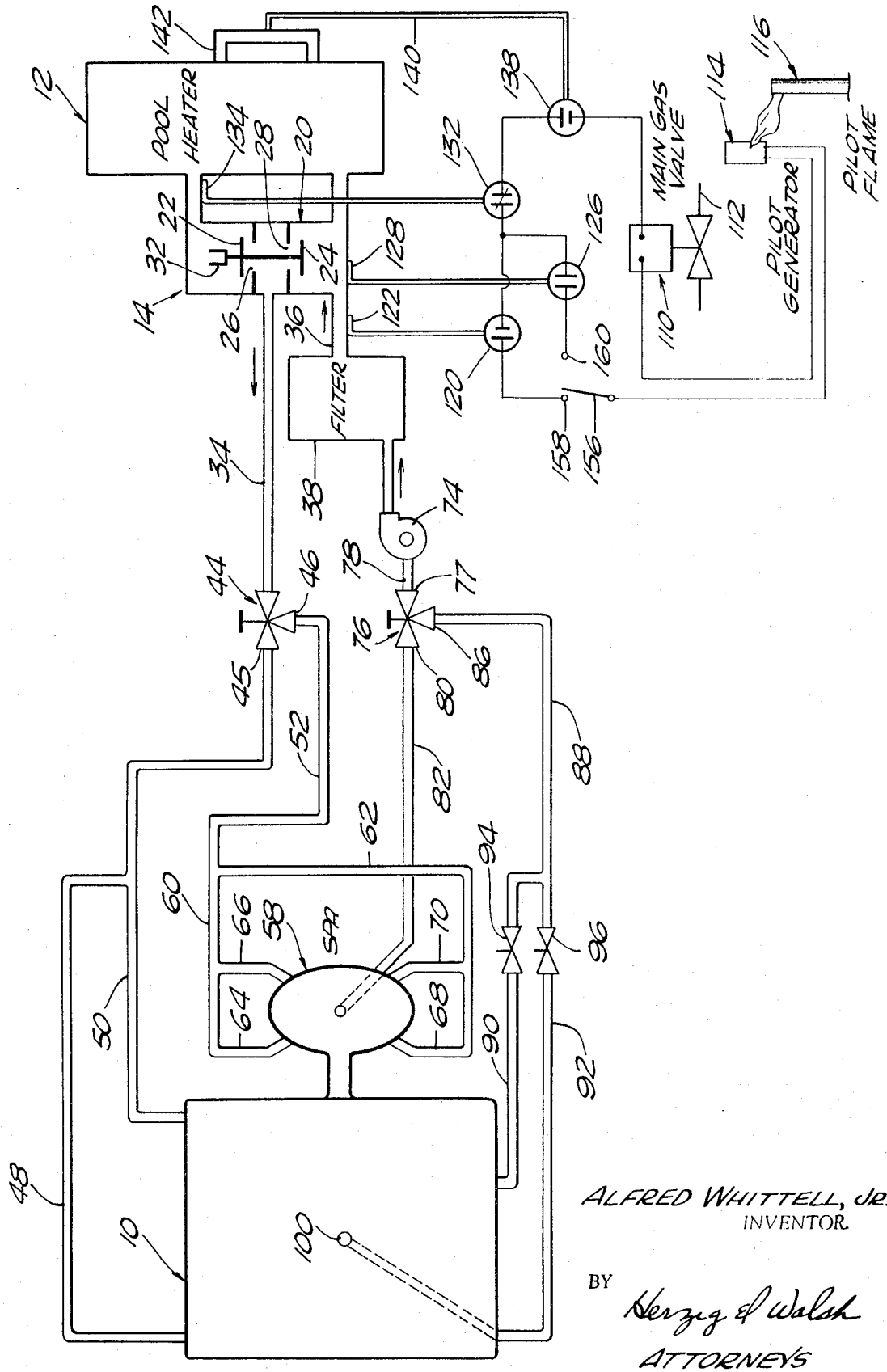

3,623,165
MULTIPLE POOL SYSTEM WITH COMMON HEATER
Alfred Whittell, Jr., Los Angeles, Calif., assignor to Raypak Company, Inc., El Monte, Calif.
Filed Feb. 9, 1970, Ser. No. 9,650
Int. Cl. E04h 3/16, 3/18
U.S. Cl. 4—172.15                                7 Claims

ABSTRACT OF THE DISCLOSURE

A multiple pool system comprising a main pool and a small therapeutic pool or spa, both pools being heated from a common heater. Operation can be shifted from one pool to the other manually. The pool heater is controlled by a flow governor controlling a bypass to normally limit the temperature in the heater. The heater is gas fired and the gas valve is controlled in response to temperature of water returning to the heater. When operation is shifted to the therapeutic pool the control point of the control of the gas valve is raised which causes the flow governor to cut-off the bypass across the pool heater resulting in the water in the spa or therapeutic pool being maintained at a higher temperature.

SUMMARY OF THE INVENTION

The invention relates to swimming pool heaters and control thereof and more particularly to a system which includes an additional small therapeutic pool or spa which is maintained at a higher temperature for hydromassage purposes. Typically in the prior art where there were two pools, two pool heaters were required or one heater but without temperature control in the small therapeutic pool. The herein invention provides an arrangement wherein a single common heater heats the water both for the main pool and the small therapeutic pool; operation can be shifted at will to the small pool with the temperature being automatically controlled and maintained at the desired higher value. The primary object of the invention is to realize this type of system having the desired control and operating characteristics utilizing a single heater.

A therapeutic pool is a small shallow pool adjacent to a conventional swimming pool. It is usually maintained at a temperature which, by way of example, would be 105 degrees Fahrenheit. In the arrangement of the herein invention, merely by shifting valves, operation can be shifted to the therapeutic pool, the heated water going to this pool rather than to the regular pool. At the same time control is shifted so that the common heater maintains the desired higher temperature in the therapeutic pool. The result is that this speeds up heating the therapeutic pool, saves fuel, and provides for very accurate temperature control of the therapeutic pool or spa within plus or minus one-half degree Fahrenheit. Higher temperatures than bath temperatures are too high and may be scalding, whereas lower temperatures lack therapeutic values. The realization of these results in the system constitute further objects of the invention. An additional object is to realize these results in a type of system embodying a flow governor as referred to in the foregoing, which normally controls a bypass across the pool heater and which moves to close the bypass when the system is operating in the mode wherein the heated water is delivered only to the therapeutic pool.

Further objects and additional advantages of the invention will become apparent from the following detailed description and annexed drawing, wherein a single figure is a diagrammatic view of a preferred form of the invention.

Referring now more particularly to the drawing, numeral 10 designates a typical swimming pool, the water in which is heated by a gas fired pool heater designated diagrammatically at 12. The pool heater is of a conventional known commercial type. The pool heater is provided with a flow governor designated diagrammatically at 14. The pool, the heater, and the flow governor may be of the type shown in Pat. No. 2,884,197 of Alfred Whittell, Jr. and that patent is incorporated herein by reference. The flow governor might also be of the type shown more in detail in Pat. No. 3,148,828 of Alfred Whittell, Jr. and said patent is incorporated herein by reference. The flow governor 14 is embodied in a bypass 20 across the pool heater. It comprises a double modulating valve including valve members 22 and 24, which cooperate with ports 26 and 28, the valve members being actuatable by a thermostatic element 32 responsive to flow of water from the pool through the flow governor and to the delivery line 34 of the pool. The return line 36 has a typical filter 38 in it, the bypass 20 being from the return line 36 to the delivery line 34.

The delivery line has in it a three way valve 44, the three way valve 44 has outlets 45 and 46. Outlet 45 can deliver water to the main pool and through branch pipe connections 48 and 50. Outlet 46 can deliver water through line 52, which has branch connections providing for delivery of hot water to the therapeutic pool or spa 58 at four equally spaced points, the branch connections, including the branches 60 and 62 and then the four branches 64, 66, 68, and 70.

The return line to the filter 38 has in it a circulating pump 74, the return lines from the pools being through another three way valve 76 having an outlet 77 connected to line 78 that delivers to the pump 74. The three way valve 76 has an inlet 80 connected to line 82, which connects to the drain outlet of the therapeutic pool 58. The three way valve 76 has an inlet 86 connected to line 88. Line 88 connects to branch lines 90 and 92 having in them gate valves 94 and 96. Line 90 connects to a side part of the pool 10 and line 92 connects to the main drain 100 of the pool. The gate valves 94 and 96 are manual valves which can be adjusted for balancing the ratios of water drawn from the pool through lines 90 and 92.

As mentioned, the exemplary form of heater is gas fired, the gas valve being an electrical type as shown at 110 in the gas line 112. A conventional pilot control 114 is provided respective to a pilot flame generated by a pilot burner 116.

The gas valve is controlled by several control instrumentalities. Numeral 120 designates a thermostatic controller having electrical contacts that are thermostatically controlled by way of a temperature responsive bulb 122 connected by a tube to the unit 120. This thermostatic controller is usually set at a range of 70 to 80 degrees Fahrenheit, the bulb 122 being responsive to the temperature in line 36 carrying the return water to the heater. Numeral 126 designates a similar type of thermostatic controller responsive to bulb 128 also adjacent the conduit carrying return water to the heater. This thermostatic controller is typically set to maintain a temperature of, for example, 115 degrees Fahrenheit, which is a relatively higher temperature as will be referred to presently. Numeral 132 designates a further thermostatic controller, contacts of which are normally closed, this controller being responsive to a thermostatic bulb 134 positioned to be responsive to the temperature of water leaving the pool heater. Numeral 138 designates a pressure responsive switch having contacts, this switch being connected by tube 140 to pipe 142 which is part of the water flow conduit through the heater. The switch 138 closes in response to pressure indicative of flow through the heater.

This instrument might be a flow switch rather than a pressure responsive switch.

Numeral 156 designates a manual switch cooperating with terminals 158 and 160. Terminal 160 is in a branch or shunt circuit having in it the contacts of thermostat 126, this being a circuit that bypasses the thermostat 120.

Included in the circuit of the pilot controller 114 are the manual switch 156, the thermostats 120 and 132, the pressure switch 138 and the gas valve 110. In the system as shown the unit 114 generates current in response to heat. As an alternative, the circuit may be powered by a transformer having a secondary winding generating 24 volts for example, the unit 114 being of a type operable to interrupt the circuit in the absence of pilot flame. The operation of the system will next be described.

OPERATION

The system may be operated in a normal way with hot water being delivered only to the main pool through the piping described in the foregoing. In this mode of operation, the three way valves 44 and 76 are set so that the water is delivered only to the main pool and is drawn only from the main pool. In this mode of operation the flow governor 14 operates to control the temperature within the pool heater in a manner described in the patents referred to in the foregoing. Typically it is set to maintain the temperature of the water leaving the boiler within a range of 105 degrees to 115 degrees Fahrenheit. A higher temperature will accelerate scale formation whereas a lower temperature will allow flue product condensation to form on the outside of the tubes. In this mode of operation, the manual switch is closed to the terminal 158 and the gas valve 110 is controlled by the thermostat 120 to maintain a temperature of, for example, 70 degrees to 80 degrees Fahrenheit in return line 36. The thermostatic element 32 of the flow governor 14 may be of a conventional type and typically may be of a type commercially known as a Vernatherm. Upon rising temperature of water leaving the pool heater, it acts to close or throttle the port 28 cutting off flow through the bypass 20 and allowing more water to go through the pool heater and thus limit the rise of temperature in the heater.

When it is desired to use the therapeutic pool or spa, the three-way valves 44 and 76 are set to their opposite positions so that water delivered from the heater through line 34 is delivered only to the therapeutic pool 58 and water is now returned to the pool heater only from the therapeutic pool through the connections as described in the foregoing. When operation is shifted to this mode, the manual switch 156 is closed to the opposite terminal 160 where it bypasses the thermostatic controller 120 now placing the thermostatic controller 126 in control of the main gas valve 110. This controller is set to maintain a temperature of, for example, 105 degrees Fahrenheit, which is a desirable temperature for the therapeutic pool 58. Due to the relatively small volume of water in the therapeutic pool, the return water in line 36 rapidly increases in temperature. The outlet water from the heater also rapidly increases in temperature and soon exceeds 115 degrees Fahrenheit. This causes the flow governor 14 to move in a direction to close the port 28 and to cause all of the return water to go through the boiler so that the water for the therapeutic pool is heated to the desired temperature quickly. The thermostatic controller 132 is a limit controller responsive to the temperature of water leaving the pool heater. Its contacts are normally closed but at a suitable limiting temperature would open and cut off the heat to the pool heater to prevent the occurrence of an excessive and undesirable temperature. The purpose of the pressure switch 138 is to insure that there is flow through the heater before the main gas valve can be opened. As pointed out, this controller could be a flow switch as well.

From the foregoing, those skilled in the art will readily understand the nature and construction of the invention and its operation and the manner in which it achieves and realizes all of the objectives and advantages as set forth in the foregoing. It will be seen that the invention makes it possbie to accommodate both a main pool and a therapeutic pool with a single heater, while nevertheless realizing all of the desired control characteristics. The results are accomplished in an extremely simple way. In the normal operation the flow governor protects the temperature in the pool heater while a desired temperature is maintained in the main pool. Merely by shifting the three way valves and changing the position of the manual switch 156 the therapeutic pool is brought into operation by itself with the water quickly being brought up to the desired temperature. The flow governor 14 now automatically operates in a desired way to cut off the bypass and to cause the water to go through the pool heater so as to quickly heat it up to the desired temperature of the spa. The heater is nevertheless protected during this operation by the limit controller.

The foregoing disclosure is representative of a preferred form of the invention and is to be interpreted in an illustrative rather than a limiting sense, the invention to be accorded the full scope of the claims appended hereto.

What is claimed is:

1. A pool system comprising a main pool, a relatively small therapeutic pool, a single water heater having delivery and return connections to both of the pools and temperature control means, responsive to the temperature of water at said heater, for maintaining water temperature in the main pool and for maintaining a relatively higher temperature in the therapeutic pool as desired, valve control means for selectively directing heated water from the heater to either the main pool or the therapeutic pool and return therefrom to said heater, and manual control means for adjusting the temperature control means whereby to selectively control temperature in the main pool or to maintain a relatively higher temperature of water circulating through the therapeutic pool.

2. A system as in claim 1, wherein said control means comprises a flow governor positioned at the water outlet of the pool heater whereby to regulate flow through the heater to control the volume of water flowing therethrough.

3. A system as in claim 2, including a bypass across the heater arranged to cause return water from a pool to bypass the heater.

4. A system as in claim 3, wherein said flow governor is responsive to temperature within the heater, said control means being responsive to temperature of water flowing through the heater and said manual control means being settable to a temperature at which the flow governor is caused to close the bypass whereby all of the return water flows through the pool heater for maintaining a relatively high temperature in the therapeutic pool.

5. A system as in claim 4, including a temperature responsive limit control means responsive to temperature in the heater controlling the heat source.

6. A system as in claim 3, wherein the said flow governor is in said bypass.

7. A system as in claim 6, wherein said control means comprises separate thermostatic devices for controlling the main pool and the therapeutic pool, and the manual control means including means for selectively causing one or the other thermostatic devices to control the heater.

References Cited

UNITED STATES PATENTS 3,460,166   8/1969   Weber _____ 4—172
3,207,133   9/1965   Andersen _____ 4—172.15 X HENRY K. ARTIS, Primary Examiner